United States Patent
Dry et al.

(10) Patent No.: US 10,850,646 B2
(45) Date of Patent: Dec. 1, 2020

(54) TRACK ASSEMBLY AND CARRIAGE ASSEMBLY FOR A VEHICLE

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/268,570

(22) Filed: Feb. 6, 2019

(65) Prior Publication Data

US 2020/0247278 A1    Aug. 6, 2020

(51) Int. Cl.
*B60N 2/08* (2006.01)
*B60N 2/07* (2006.01)
*B60N 2/06* (2006.01)

(52) U.S. Cl.
CPC ........... *B60N 2/0881* (2013.01); *B60N 2/067* (2013.01); *B60N 2/0722* (2013.01)

(58) Field of Classification Search
CPC ..... B60N 2/0881; B60N 2/0722; B60N 2/067
USPC ................. 248/647, 657, 424, 430
See application file for complete search history.

(56) References Cited

U.S. PATENT DOCUMENTS

| | | | | |
|---|---|---|---|---|
| 3,912,341 | A * | 10/1975 | Stein .................... | A47B 88/493 384/18 |
| 4,184,656 | A | 1/1980 | Wakeley | |
| 4,621,784 | A * | 11/1986 | Kaesling ................ | B60N 2/072 248/419 |
| 4,907,776 | A * | 3/1990 | Nemoto ............... | B60N 2/0232 248/430 |
| 5,483,897 | A * | 1/1996 | Doherty .................... | B66C 9/08 104/135 |
| 5,902,029 | A * | 5/1999 | Fulterer ................. | A47B 88/57 312/334.29 |
| 6,629,721 | B1 | 10/2003 | Macey | |
| 8,382,057 | B2 | 2/2013 | Napau et al. | |
| 9,248,759 | B2 | 2/2016 | Brand et al. | |
| 2007/0157752 | A1* | 7/2007 | Knopfle ................ | F16H 57/021 74/27 |
| 2011/0062285 | A1 | 3/2011 | Herzog et al. | |
| 2015/0298580 | A1* | 10/2015 | Kanai .................. | B60N 2/0722 248/430 |

* cited by examiner

*Primary Examiner* — Muhammad Ijaz
(74) *Attorney, Agent, or Firm* — David Coppiellie; Price Heneveld LLP

(57) ABSTRACT

A vehicle includes a carriage assembly and a track assembly. The carriage assembly includes a central roller flanked by side rollers on an axle. A carriage rail can support the axle. The track assembly includes a rack screw positioned in a lower portion of a channel. The channel receives the carriage assembly such that a drive wheel can engage with the rack screw.

20 Claims, 7 Drawing Sheets

TRACK ASSEMBLY AND CARRIAGE ASSEMBLY FOR A VEHICLE

FIELD OF THE DISCLOSURE

The present disclosure generally relates to a vehicle. More specifically, the present disclosure relates to a track assembly and a carriage assembly for a vehicle.

BACKGROUND OF THE INVENTION

Vehicles are often provided with seating assemblies that can be actuated in a longitudinal direction relative the mounts that anchor the seating assemblies to a floor of the vehicle. However, additional solutions are needed to provide greater customization opportunities for consumers, particularly with the strides being taken toward autonomous vehicles.

SUMMARY OF THE INVENTION

According to a first aspect of the present disclosure, a vehicle includes a carriage assembly and a track assembly. The carriage assembly includes a central roller flanked by side rollers on an axle. A carriage rail can support the axle. The track assembly includes a rack screw positioned in a lower portion of a channel. The channel receives the carriage assembly such that a drive wheel engages with the rack screw.

Embodiments of the first aspect of the present disclosure can include any one or a combination of the following features:
- a lock assembly positioned on the carriage assembly, the lock assembly being operable between an engaged position and a disengaged position with the rack screw;
- the disengaged position of the lock assembly relative to the rack screw allowing the carriage assembly to remain stationary as the rack screw rotates;
- the drive wheel engages with threads on the rack screw such that the drive wheel can traverse a length of the rack screw while the rack screw is stationary;
- the rack screw being rotatable and including threads that engage with the drive wheel such that rotation of the rack screw results in horizontal actuation of the carriage assembly;
- the carriage assembly including a cross member that is engaged by a latch of a seating assembly when the seating assembly is coupled to the carriage assembly;
- the cross member being oriented generally perpendicular to a travel direction of the carriage assembly;
- the carriage assembly including a worm drive that drives the drive wheel;
- the central roller being provided with a concave shape that the rack screw is received within;
- a drive module positioned proximate an end of the track assembly, the drive module including a motor that drives the rack screw in at least one of a clockwise and a counter-clockwise direction; and
- the drive module further including a transfer gear that is positioned between a drive shaft and the rack screw, the transfer gear being driven by the drive shaft to induce rotational motion of the rack screw.

According to a second aspect of the present disclosure, a vehicle includes a carriage assembly and a track assembly. The carriage assembly includes a central roller flanked by side rollers on an axle. A carriage rail supports the axle and has a generally sinusoidal shape. The track assembly includes a rack screw positioned in a lower portion of a channel. The channel receives the carriage assembly such that a drive wheel is permitted to engage with the rack screw.

Embodiments of the second aspect of the present disclosure can include any one or a combination of the following features:
- a lock assembly positioned on the carriage assembly, the lock assembly being operable between an engaged position and a disengaged position with the rack screw, wherein the disengaged position of the lock assembly relative to the rack screw allows the carriage assembly to remain stationary as the rack screw rotates;
- the drive wheel engages with threads on the rack screw such that the drive wheel can traverse a length of the rack screw while the rack screw is stationary;
- the rack screw is rotatable and includes threads that engage with the drive wheel such that rotation of the rack screw results in horizontal actuation of the carriage assembly;
- the carriage assembly includes a cross member that is engaged by a latch of a seating assembly when the seating assembly is coupled to the carriage assembly, wherein the cross member is oriented generally perpendicular to a travel direction of the carriage assembly; and
- a drive module positioned proximate an end of the track assembly, the drive module including a motor that drives the rack screw in at least one of a clockwise and a counter-clockwise direction, the drive module further including a transfer gear that is positioned between a drive shaft and the rack screw, the transfer gear being driven by the drive shaft to induce rotational motion of the rack screw.

According to a third aspect of the present disclosure, a vehicle includes a carriage assembly and a track assembly. The carriage assembly includes a central roller flanked by side rollers on an axle. A carriage rail supports the axle and has a generally sinusoidal shape. The carriage rail is positioned such that the central roller and the side rollers are separated from one another by the carriage rail. The track assembly includes a rack screw positioned in a lower portion of a channel. The channel receives the carriage assembly such that a drive wheel engages with the rack screw.

Embodiments of the third aspect of the present disclosure can include any one or a combination of the following features:
- the rack screw is rotatable and includes threads that engage with the drive wheel such that rotation of the rack screw results in horizontal actuation of the carriage assembly, wherein the drive wheel engages with the threads on the rack screw such that the drive wheel can traverse a length of the rack screw while the rack screw is stationary; and
- a drive module positioned proximate an end of the track assembly, the drive module including a motor that drives the rack screw in at least one of a clockwise and a counter-clockwise direction, the drive module further including a transfer gear that is positioned between a drive shaft and the rack screw, the transfer gear being driven by the drive shaft to induce rotational motion of the rack screw.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
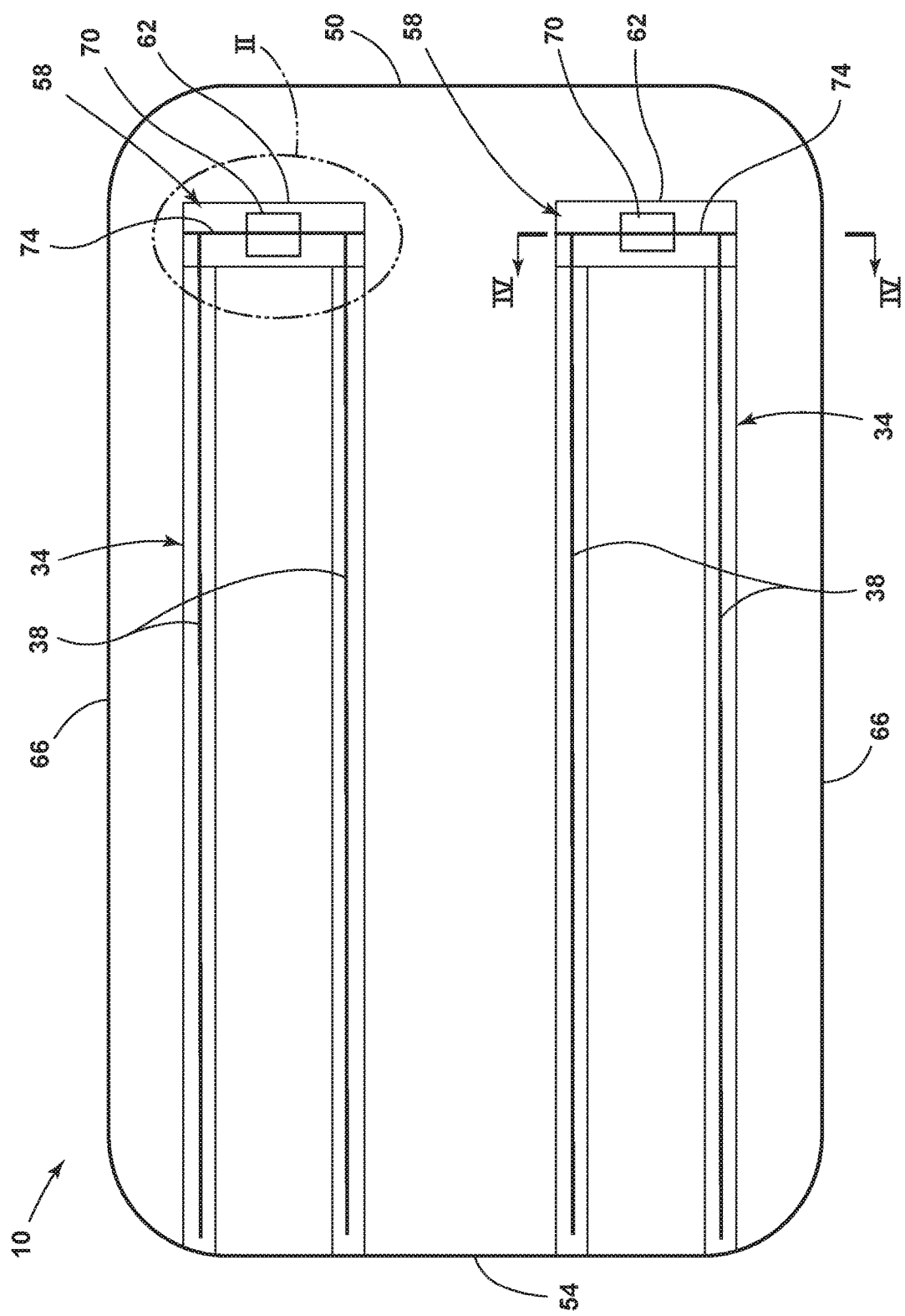
FIG. 1 is a top view of a cabin of a vehicle having a plurality of track assemblies and drive modules positioned at a vehicle-forward end of the track assemblies.
Figure 4:
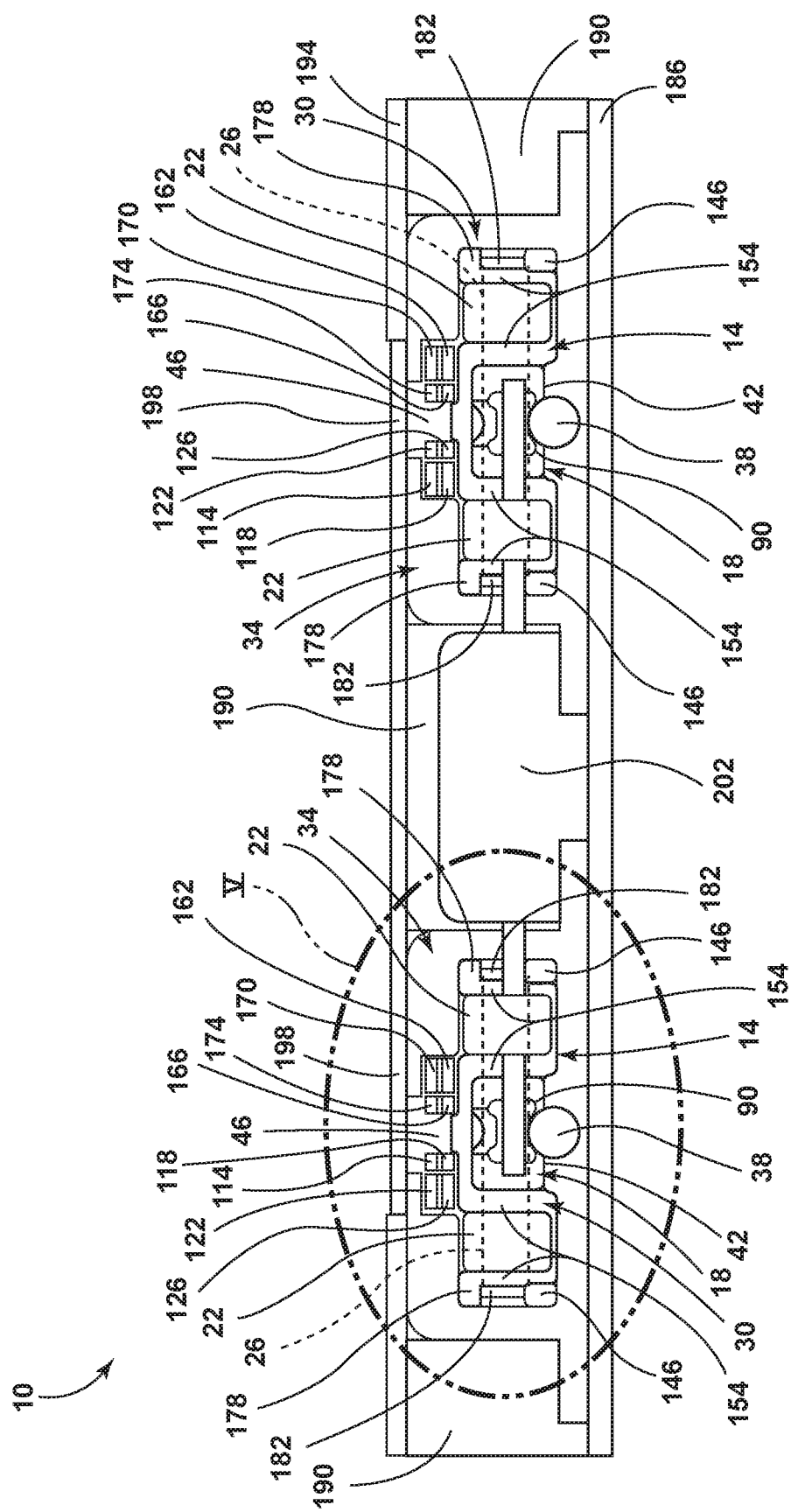
FIG. 4 is a cross-sectional view of one of the track assemblies, taken at line IV-IV of FIG. 1, illustrating various components of the track assembly and the carriage assembly.
Figure 5:
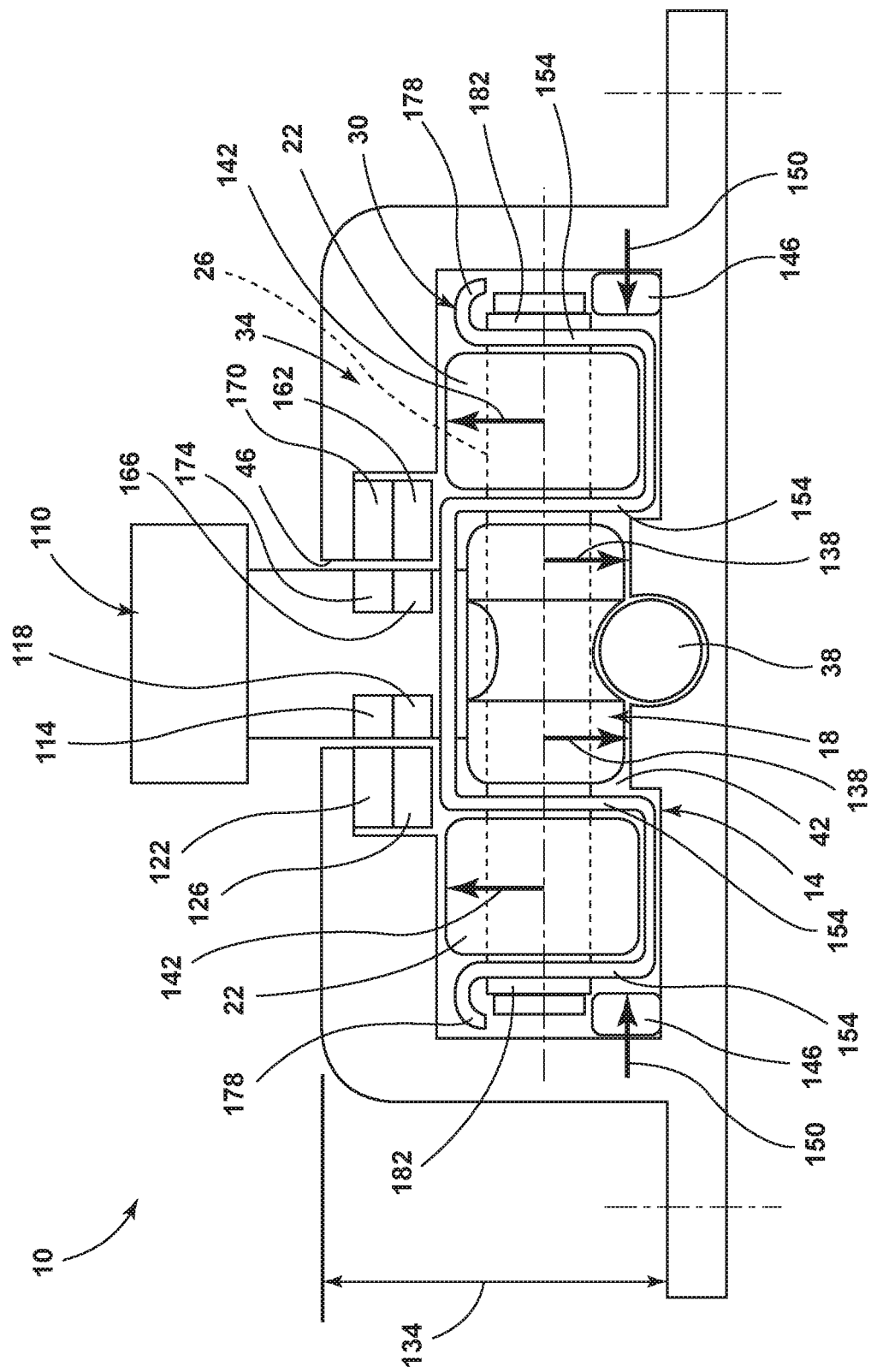
FIG. 5 is an expanded view of the track assembly of FIG. 4, taken at section V of FIG. 4, illustrating the interaction of the various components of the track assembly and the carriage assembly.

For purposes of description herein, the terms "upper," "lower," "right," "left," "rear," "front," "vertical," "horizontal," and derivatives thereof shall relate to the concepts as oriented in FIG. 1 or 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a track assembly and a carriage assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 10 generally designates a vehicle. The vehicle 10 can include a carriage assembly 14. In various examples, the carriage assembly 14 can include a central roller 18 flanked on either side by side rollers 22. The central roller 18 and the side rollers 22 can be coupled on an axle 26. A carriage rail 30 can support the axle 26. The carriage rail 30 can be generally sinusoidal in shape. In some examples, the carriage rail 30 can be positioned such that the central roller 18 and the side rollers 22 are separated from one another by the carriage rail 30. The vehicle 10 can include a track assembly 34. The track assembly 34 can include a rack screw 38. In various examples, the rack screw 38 can be positioned in a lower portion 42 of a channel 46. The channel 46 can receive the carriage assembly 14 such that the central roller 18 and/or a drive wheel engages with the rack screw 38.

Referring again to FIG. 1, the vehicle 10 can be provided with one or more of the track assemblies 34. The track assemblies 34 can extend along a longitudinal axis of the vehicle 10 such that the track assemblies 34 extend along a substantial portion of a distance between a front 50 and a rear 54 of the vehicle 10. In some examples, the track assemblies 34 can extend to the rear 54 of the vehicle 10 such that the carriage assemblies 14 (FIG. 3) can be loaded into the track assemblies 34 from an open end of the track assemblies 34 at the rear 54 of the vehicle 10. A drive module 58 can be positioned proximate an end 62 of the track assembly 34. In the depicted example, the end 62 of the track assembly 34 that the drive module 58 is positioned proximate to may be referred to as a closed end of the track assembly 34. In general, the open end or free end of the track assembly 34 can be positioned opposite the end 62 that is provided with the drive module 58. It is contemplated that the track assembly 34 may be provided with free or open ends at both ends of the track assembly 34 and that the drive module being coupled to the track assembly 34 at one of the ends dictates which of the ends is the closed end. While the depicted example shows the track assemblies 34 as extending along the longitudinal axis of the vehicle 10, it is contemplated that the track assemblies 34 may additionally or alternatively extend along a lateral axis of the vehicle 10. The lateral axis and the longitudinal axis may be generally perpendicular to one another such that the lateral axis extends between sides 66 of the vehicle 10. In some examples, the track assemblies 34 may extend along the vehicle 10 at angles to the lateral and/or longitudinal axis such that the track assemblies 34 additionally or alternatively extend along angular or diagonal axes of the vehicle 10. In various examples, the drive module 58 can include a motor 70 that drives the rack screw(s) 38 in at least one of a clockwise and a counter-clockwise direction. A drive shaft 74 may extend between the motor 70 and the rack screw(s) 38. The drive shaft 74 can transmit motion induced by the motor 70 to the rack screw(s) 38. Said another way, the drive shaft 74 can be driven to rotate by the motor 70 and the rotational motion of the drive shaft 74 can be transferred to the rack screw(s) 38.

Figure 2:
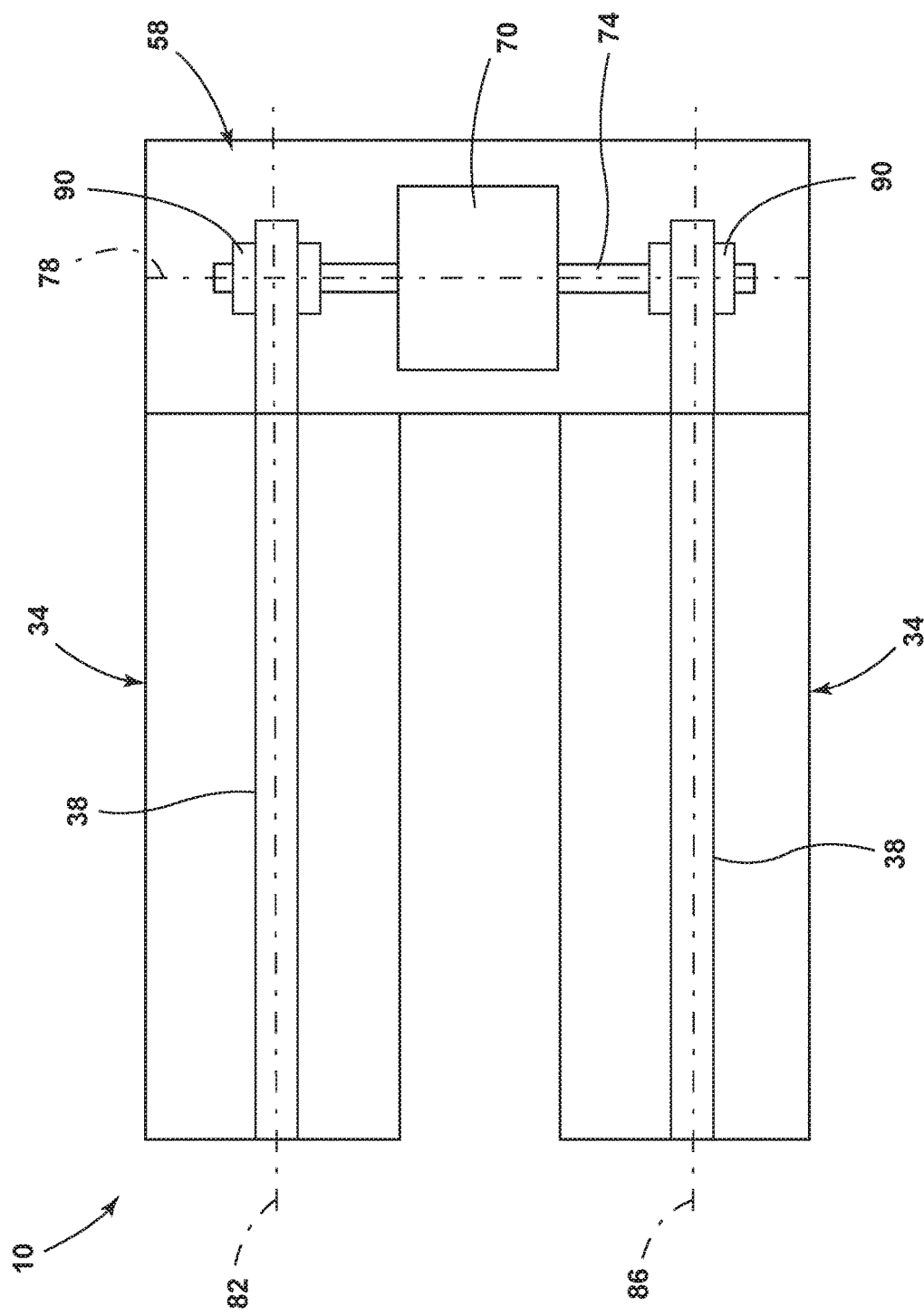
FIG. 2 is an expanded view of the drive module and the track assembly, taken at section II of FIG. 1, illustrating an interaction between the drive module and the track assembly.

Referring now to FIG. 2, the drive module 58 can be coupled to a plurality of the rack screws 38 such that the motor 70 is able to drive rotational motion of each of the plurality of rack screws 38. Accordingly, a single motor 70 may be utilized to rotate the drive shaft 74 about a first rotational axis 78 and the rotation of the drive shaft 74 can rotate one of the rack screws 38 about a second rotational axis 82 and another of the rack screws 38 about a third rotational axis 86. With such a configuration, synchronization between the rack screws 38 can be achieved in a straightforward manner for the rack screws 38 that are driven by the drive module 58. Synchronization between the rack screws 38 that are driven by the drive module 58 can be important for examples where the carriage assembly 14 is coupled to more than one of the plurality of rack screws 38. In alternative examples, the drive module 58 may be provided with a plurality of the motors 70 that each drives one of a plurality of the drive shafts 74. For example, the drive module 58 may be provided with one of the motors 70 and one of the drive shafts 74 for each of the rack screws 38 that are driven by the drive module 58. Synchronization between the rotations of the rack screws 38 that are driven by the drive module 58 in examples that employ more than one motor 70 per drive module 58 can be accomplished, however, the synchronization may be more difficult and/or more complex. Nevertheless, situations and configurations are contemplated where the plurality of motors 70 per drive module 58 is a preferable arrangement.

Referring again to FIG. 2, the drive module 58 can include a transfer gear 90 that is positioned between the drive shaft 74 and the rack screw 38. The transfer gear 90 can be directly coupled to the drive shaft 74. The transfer gear 90 may be various gear arrangements that can transfer rotational motion from the drive shaft 74 to the rack screw 38. For example, the transfer gear 90 may be a spur gear, a worm drive, a straight bevel gearbox, a spiral bevel gearbox, and the like. The transfer gear 90 can be driven by the drive shaft 74 to induce rotational motion of the rack screw 38. Accordingly, the drive shaft 74 can induce clockwise and/or counter-clockwise rotation of the rack screws 38 depending on the direction of rotation of the drive shaft 74. For example, clockwise rotation of the drive shaft 74 may induce clockwise rotation of the rack screw(s) 38 coupled to the drive module 58. Alternatively, clockwise rotation of the drive shaft 74 may induce counter-clockwise rotation of the rack screw(s) 38 coupled to the drive module 58. In some examples that utilize a single motor 70 in the drive module 58 to drive a plurality of the rack screws 38, the transfer gears 90 may be provided with opposing inclinations of teeth on the transfer gear 90. By so arranging the transfer gears 90, rotation of the drive shaft(s) 74 by the motor 70 may induce the same angular rotation of the coupled rack screws 38. Alternative approaches for ensuring synchronization in a rate of rotation and a direction of rotation of the rack screws 38 coupled to the drive module 58 are contemplated and fall within the present disclosure.

Figure 3:
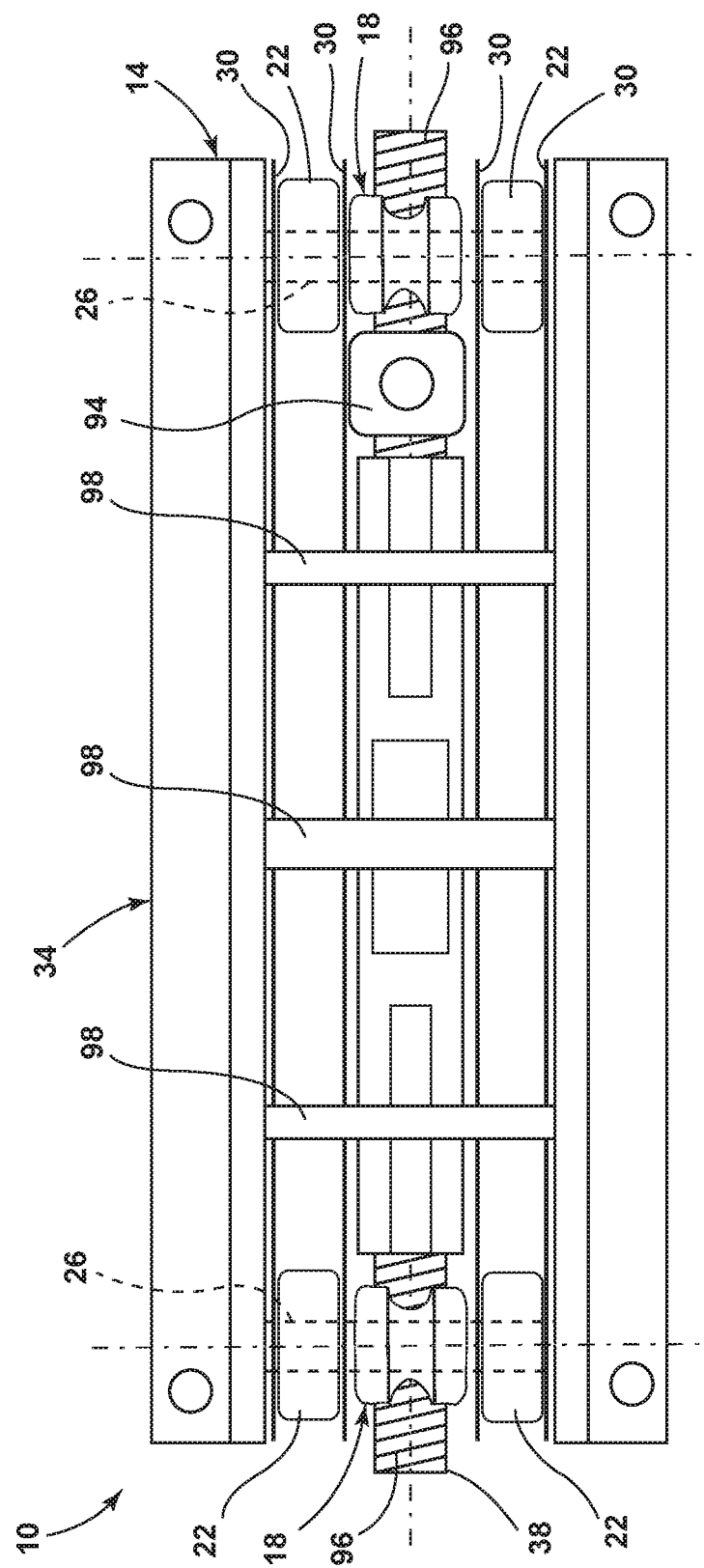
FIG. 3 is a top view of a carriage assembly coupled to the track assembly, illustrating various components of the carriage assembly and an interaction between the carriage assembly and a rack screw.

Referring to FIG. 3, in some examples, a lock assembly 94 can be positioned on the carriage assembly 14. The lock assembly 94 can be actuated between an engaged position and a disengaged position with the rack screw 38. Accordingly, the lock assembly 94 can be utilized to retain a position of the carriage assembly 14 along the track assembly 34. In some examples, the lock assembly 94 can be utilized to engage the carriage assembly 14 with threads 96 on the rack screw 38. In such examples, the engaged position of the lock assembly 94 can allow the associated carriage assembly 14 to be actuated along the track assembly 34 by the rack screw 38 and/or the engaged position of the lock assembly 94 can retain a position of the carriage assembly 14 along the track assembly 34. Additionally, in such examples, the disengaged position of the lock assembly 94 relative to the rack screw 38 can allow the carriage assembly 14 to remain stationary as the rack screw 38 rotates. Said another way, in some examples, the lock assembly 94 controls engagement between the carriage assembly 14 and the rack screw 38 such that the carriage assembly 14 is actuated along the track assembly 34 by the rack screw 38 only when the lock assembly 94 is engaged with the rack screw 38. In various examples, the lock assembly 94 can be provided in the carriage assembly 14 rather than in a carriage-mountable component (e.g., seating assembly, storage compartments, consoles, etc.) that is coupled to the carriage assembly 14 such that the carriage assembly 14 can be moved by the rack screw 38 independent of whether the carriage assembly 14 is coupled to a carriage-mountable component. The carriage assembly 14 can include one or more cross members 98. The cross members 98 can provide additional strength and rigidity to the carriage assembly 14, as well as provide a location on the carriage assembly 14 where a seating assembly 102 or other carriage-mountable component can engage with the carriage assembly 14 (see FIG. 6). For example, one or more latches 106 of the seating assembly 102 can engage with the cross members 98 when the seating assembly 102 is coupled to the carriage assembly 14 (see FIG. 6). In the depicted example, the cross members 98 can be oriented generally perpendicular to a travel direction of the carriage assembly 14 and/or the vehicle 10. In various examples, the central roller 18 can be provided with a concave shape or a degree of concavity that the rack screw 38 is received within such that a greater contact surface area between the central roller 18 and the rack screw 38 is achieved for examples where the central roller 18 directly engages with the rack screw 38. However, in examples where the central roller 18 does not directly engage with the rack screw 38, the concavity provided in the central roller 18 can allow a degree of clearance between the rack screw 38 and the central roller 18 such that the rotation of the rack screw 38 is not impeded by the central roller 18. In either example, the concavity may also aid in retention in a horizontal direction of the carriage assembly 14 to the track assembly 34.

Referring now to FIGS. 4-7, the components that engage with the carriage assembly 14 can be provided with coupling portions 110 that engage with the carriage assembly 14 and/or the track assembly 34. The coupling portions 110 may be provided with one or more of the latches 106 to aid in retention of the components that engage with the carriage assembly 14. In some examples, the coupling portions 110 may be coupled to an underside of one or more adjustment tracks that are provided on the component(s) that couple with the carriage assembly 14 (e.g., the seating assembly 102) such that horizontal adjustments can be made for comfort of an occupant, positioning of cargo, or the like. The adjustment tracks can enable horizontal actuation of the seating assembly 102 along the adjustment tracks relative to the coupling portion 110 without adjusting a lateral or longitudinal position of the coupling portion 110 relative to the carriage assembly 14, the track assembly 34, and/or the rack screw 38. The coupling portions 110 can be referred to as anchors. The anchors may include active anchors and passive anchors. The active anchors can be provided with power and data connections that can communicate with controllers and onboard computer modules to convey various information about the components coupled to the carriage assemblies 14 (e.g., the seating assembly 102), such as lateral position, longitudinal position, rotational position, occupancy status, comfort settings or preferences, various safety statuses, and so on. The active anchors can also provide power to various powered components that can be provided on the seating assemblies 102 (e.g., heating and ventilating of the seating assembly 102, seat adjustment motors, safety features, safety sensors, entertainment features, etc.). Components that are not seating assemblies 102 and are coupled to the carriage assemblies 14 can receive power for thermal management of storage units, power for the adjustment of the component within the track assembly 34, monitoring safety sensors of the components, monitoring security sensors of the components, monitoring occupied vs. unoccupied statuses of storage units, and so on. The power and data connections to the coupling portions 110 can be facilitated by a power connector 114 and a data connector 118, respectively, that are provided on one or more of the active anchors. The power and data connectors 114, 118 are positioned and configured to engage with power sources 122 and data transmitters 126 that are provided in the track assembly 34. The power and data connectors 114, 118 are electrically coupled to the various components within the seating assemblies 102 or other carriage-mountable components that are powered and/or monitored. The power and data connectors 114, 118 can circumferentially extend from an exterior surface of the coupling portion 110 such that the power and data connectors 114, 118 can engage with the power sources 122 and the data transmitters 126, respectively. Alternatively, the power and data connectors 114, 118 can be positioned in grooves or recesses in the coupling portion 110 such that the power and data connectors 114, 118 can engage with the power sources 122 and the data transmitters 126, respectively.

Referring again to FIGS. 4-7, the central roller 18 can be provided with threads that engage with the threads 96 on the rack screw 38 (see FIGS. 3 and 7). In various examples, the central roller 18 can traverse a length of the rack screw 38 while the rack screw 38 is stationary. In such examples, the central roller 18 may be driven to rotate such that the central roller 18 climbs the threads 96 of the rack screw 38 while the rack screw 38 is stationary. The central roller 18 may be driven by a drive assembly 130, for example, by a worm drive and/or an electric motor (see FIG. 7). One of skill in the art will recognize that, due to the inline nature of the side rollers 22 and the central roller 18, the view shown in FIG. 7 is intended to depict the drive assembly 130 engaging with the central roller 18 and not the side roller 22. In various examples, the rack screw 38 and the central roller 18 may be rotated simultaneously such that the carriage assembly 14 that is associated with the rotating central roller 18 remains stationary relative to the track assembly 34. That is, the rotation of the central roller 18 can counteract the rotation of the rack screw 38. Additionally or alternatively, the rack screw 38 and the central roller 18 may be rotated simultaneously such that the carriage assembly 14 traverses the track assembly 34 more rapidly than when the central roller 18 or the rack screw 38 are rotated exclusively. That is, the rotation of the central roller 18 and the rotation of the rack screw 38 may work in concert. Such arrangements can be beneficial when some of the carriage assemblies 14 coupled to the track assembly 34 are desired to be moved to an alternate location while some others of the carriage assemblies 14 are desired to remain in their current locations or some of the carriage assemblies 14 are desired to move to a lesser extent than other carriage assemblies 14. By providing the central roller 18 as a driven roller, horizontal actuation of the carriage assembly 14 can be accomplished by the rack screw 38 and/or the central roller 18. Additionally, the driven central roller 18 and the rack screw 38 can each be utilized to retain the carriage assembly 14 in a given position along the track assembly 34 by locking or otherwise preventing rotation of the central roller 18 and/or the rack screw 38. For example, the drive assemblies that are responsible for rotation of the central roller 18 and/or the rack screw 38 can be locked or prevented from rotation to retain the carriage assembly 14 in a given location. In various examples, the central roller 18 and/or the rack screw 38 may be unidirectional such that the central roller 18 and/or the rack screw 38 are capable of rotation in only one of a clockwise and a counter-clockwise direction, thus providing a lock in the direction that opposes the unidirectional rotation. In one such example, the rack screw 38 may be rotatable in a direction that results in actuation along the track assembly 34 in a first direction (e.g., in a vehicle-rearward direction) while the central roller 18 may be rotatable in a second direction (e.g., in a vehicle-forward direction) that counteracts or opposes the actuation along the track assembly 34 by the rack screw 38. In such an example, the carriage assembly 14 may be loaded onto the track assembly 34 at the rear 54 of the vehicle 10 and initially positioned along the track assembly 34 by climbing the threads 96 of the rack screw 38 in a vehicle-forward direction. Subsequent adjustment of the carriage assembly 14 in a vehicle-rearward direction may then be accomplished by rotation of the rack screw 38 while the central roller 18 remains stationary. For examples where subsequent adjustment of one, but not all, of the carriage assemblies 14 is desired, then those carriage assemblies 14 that are desired to remain stationary may activate rotation of the central roller 18 to maintain those carriage assemblies 14 in substantially the same position. An example of the unidirectional motion may be accomplished by incorporating a single start worm drive or the like into the respective assemblies that drive the central roller 18 and/or the rack screw 38. The unidirectional motion, which may be accomplished by the single start worm drive or gear, can provide a constant position lock or a near-infinite position lock that resists unintended movement.

Referring further to FIGS. 4-7, in some examples, the central roller 18 and/or the rack screw 38 may be rotatable in a bidirectional fashion. Said another way, the central roller 18 and/or the rack screw 38 may be rotatable in both a clockwise and a counter-clockwise direction. Accordingly, a degree of redundancy may be intentionally provided such that if one of the central roller 18 and/or the rack screw 38 loses the ability to rotate, either temporarily or permanently, then the other of the central roller 18 and the rack screw 38 may remain operational such that the vehicle 10 and carriage assembly 14 can remain in service for a longer period of time than if the redundancy was not provided. Additionally or alternatively, one of the central roller 18 and the rack screw 38 may be provided with the ability to execute macro-movements (i.e., large traversals of the track assembly 34) while the other of the central roller 18 and the rack screw 38 may be provided with the ability to execute micro-movements (i.e., finer or smaller adjustments along the track assembly 34). Such an arrangement may be accomplished, for example, by providing different or varying gearing ratios in the relevant components of the carriage assembly 14, the rack screw 38, and/or the drive module 58. In various examples disclosed herein, the rack screw 38 is rotatable and includes the threads 96 that engage with the central roller 18. In some examples, the rotation of the rack screw 38 results in horizontal actuation of the carriage assembly 14 (e.g., along the track assembly 34).

Referring still further to FIGS. 4-7, a benefit of the present disclosure is in enabling the vehicle 10 to be equally well suited to various mounting or loading arrangements for components that engage with the track assembly 34, such as top-of-track loaded components, drop-in loaded components, and end-of-track components to name a few. The present disclosure also provides an open top portion of the channel 46 as a narrow slot that the coupling portions 110 pass through. Further, the present disclosure provides the track assembly 34 as a low-height track. For example, the track assembly 34 may have a height 134 that is less than about 70 mm, less than about 65 mm, less than about 60 mm, less than about 55 mm, less than about 50 mm, less than about 45 mm, less than about 40 mm, less than about 35 mm, less than about 30 mm, greater than 25 mm, greater than 20 mm, and/or combinations or ranges thereof, including intermediate values. In various examples, the central roller 18 may carry a majority of forces 138 that are directed in a vertically downward direction on the carriage assembly 14 (e.g., by an occupant sitting in one of the seating assemblies 102). In various examples, the side rollers 22 may distribute and/or carry a majority of forces 142 that are exerted in a vertically upward direction on the carriage assembly 14 (e.g., resulting from the vehicle 10 impacting road hazards, such as potholes). In various examples, the track assembly 34 may be provided with glide blocks 146 that prevent metal-to-metal contact and aid in opposing forces 150 that are exerted in a lateral direction within the track assembly 34 (e.g., by jostling or movement of the carriage assembly 14). The glide blocks 146 may be made of a low friction, non-metallic material. For example, the glide blocks 146 may be made from a polymer, urethane, or another suitable material. The central and side rollers 18, 22 may be made from a low friction, non-metallic material. For example, the central and side rollers 18, 22 may be made from a polymer, urethane, or another suitable material. The track assembly 34 may be made of a high-strength material, such as a metallic material. For example, the track assembly 34 may be made from a hard-anodized aluminum. The carriage assembly 14 may also be made of a high-strength material, such as a metallic material. For example, the carriage assembly 14 can be made of folded steel. The axles 26 that the central and side rollers 18, 22 are supported on may be made of a high-strength material, such as a metallic material. For example, the axles 26 may be made of high-strength steel. The axles 26 may be supported in one or more of a plurality of walls 154 of the carriage rail 30. The walls 154 may be upright or vertical walls.

Referring again to FIGS. 4-7, a drive wheel 158 can engage with the threads 96 on the rack screw 38 (see FIG. 6). In various examples, the drive wheel 158 can traverse a length of the rack screw 38 while the rack screw 38 is stationary. In such examples, the drive wheel 158 may be driven to rotate such that the drive wheel 158 climbs the threads 96 of the rack screw 38 while the rack screw 38 is stationary. The drive wheel 158 may be driven by the drive assembly 130, for example, by a worm drive and/or an electric motor. In various examples, the rack screw 38 and the drive wheel 158 may be rotated simultaneously such that the carriage assembly 14 that is associated with the rotating drive wheel 158 remains stationary relative to the track assembly 34. That is, the rotation of the central roller 18 can counteract the rotation of the rack screw 38. Additionally or alternatively, the rack screw 38 and the drive wheel 158 may be rotated simultaneously such that the carriage assembly 14 traverses the track assembly 34 more rapidly than when the drive wheel 158 or the rack screw 38 are rotated exclusively. That is, the rotation of the drive wheel 158 and the rotation of the rack screw 38 may work in concert. Such arrangements can be beneficial when some of the carriage assemblies 14 coupled to the track assembly 34 are desired to be moved to an alternate location while some others of the carriage assemblies 14 are desired to remain in their current locations or some of the carriage assemblies 14 are desired to move to a lesser extent than other carriage assemblies 14. By providing the drive wheel 158 as a driven roller, horizontal actuation of the carriage assembly 14 can be accomplished by the rack screw 38 and/or the drive wheel 158. Additionally, the driven drive wheel 158 and the rack screw 38 can each be utilized to retain the carriage assembly 14 in a given position along the track assembly 34 by locking or otherwise preventing rotation of the drive wheel 158 and/or the rack screw 38. For example, the drive assemblies that are responsible for rotation of the drive wheel 158 and/or the rack screw 38 can be locked or prevented from rotation to retain the carriage assembly 14 in a given location. In various examples, the drive wheel 158 and/or the rack screw 38 may be unidirectional such that the drive wheel 158 and/or the rack screw 38 are capable of rotation in only one of a clockwise and a counter-clockwise direction, thus providing a lock in the direction that opposes the unidirectional rotation. In one such example, the rack screw 38 may be rotatable in a direction that results in actuation along the track assembly 34 in a first direction (e.g., in a vehicle-rearward direction) while the drive wheel 158 may be rotatable in a second direction (e.g., in a vehicle-forward direction) that counteracts or opposes the actuation along the track assembly 34 by the rack screw 38. In such an example, the carriage assembly 14 may be loaded onto the track assembly 34 at the rear 54 of the vehicle 10 and initially positioned along the track assembly 34 by climbing the threads 96 of the rack screw 38 in a vehicle-forward direction. Subsequent adjustment of the carriage assembly 14 in a vehicle-rearward direction may then be accomplished by rotation of the rack screw 38 while the drive wheel 158 remains stationary. For examples where subsequent adjustment of one, but not all, of the carriage assemblies 14 is desired, then those carriage assemblies 14 that are desired to remain stationary may activate rotation of the drive wheel 158 to maintain those carriage assemblies 14 in substantially the same position. An example of the unidirectional motion may be accomplished by incorporating a single start worm drive or the like into the respective assemblies that drive the rack screw 38 and/or the drive wheel 158. The unidirectional motion, which may be accomplished by the single start worm drive or gear, can provide a constant position lock or a near-infinite position lock that resists unintended movement.

Referring further to FIGS. 4-7, in some examples, the drive wheel 158 and/or the rack screw 38 may be rotatable in a bidirectional fashion. Said another way, the drive wheel 158 and/or the rack screw 38 may be rotatable in both a clockwise and a counter-clockwise direction. Accordingly, a degree of redundancy may be intentionally provided such that if one of the drive wheel 158 and/or the rack screw 38 loses the ability to rotate, either temporarily or permanently, then the other of the drive wheel 158 and the rack screw 38 may remain operational such that the vehicle 10 and carriage assembly 14 can remain in service for a longer period of time than if the redundancy was not provided. Additionally or alternatively, one of the drive wheel 158 and the rack screw 38 may be provided with the ability to execute macro-movements (i.e., large traversals of the track assembly 34) while the other of the drive wheel 158 and the rack screw 38 may be provided with the ability to execute micro-movements (i.e., finer or smaller adjustments along the track assembly 34). Such an arrangement may be accomplished, for example, by providing different or varying gearing ratios in the relevant components of the carriage assembly 14, the rack screw 38, and/or the drive module 58. In various examples disclosed herein, the rack screw 38 is rotatable and includes the threads 96 that engage with the drive wheel 158. In some examples, the rotation of the rack screw 38 results in horizontal actuation of the carriage assembly 14 (e.g., along the track assembly 34).

Referring still further to FIGS. 4-7, in various examples, the central roller 18 and/or the drive wheel 158 may be provided as single start worm gears or drives. The drive assembly 130 drives the single start worm gear (e.g., the central roller 18 and/or the drive wheel 158) to rotate and climb or otherwise traverse the rack screw 38 when the rack screw 38 is stationary. The drive assembly 130 may additionally or alternatively drive the single start worm gear simultaneous to the rotation of the rack screw 38. In such an example, the simultaneous rotation of the single start worm gear and the rack screw 38 may be utilized to more rapidly actuate the associated carriage assembly 14 or to counteract the actuation induced by the rack screw 38. The single start worm gear can provide a constant position lock or a near-infinite position lock that resists unintended movement. For example, the single start worm gear may provide a bidirectional lock relative to the rack screw 38 when the drive assembly 130 is not actively rotating the single start worm gear. Accordingly, the single start worm gear may retain the carriage assembly 14, and any associated components coupled to the carriage assembly 14, in a desired position while also resisting unintended movement that can result from impact loads (e.g., vehicle-to-vehicle impact loads, cargo-to-component impact loads, etc.).

Referring yet again to FIGS. 4-7, in some examples, the central roller 18 may be a passive roller that is not driven by the drive assembly 130 of the carriage assembly 14. Instead, the drive wheel 158 may be provided in the carriage assembly 14 (see FIG. 6), or provided when a carriage-mountable component is coupled to the carriage assembly 14, and the drive wheel 158 can be driven by the drive assembly 130. In such examples, the drive wheel 158 can engage with the threads 96 on the rack screw 38 such that the rack screw 38 can actuate the carriage assembly 14 or the drive wheel 158 can be driven by the drive wheel 158 to climb the threads 96, counteract the actuation induced by the rotation of the rack screw 38, and/or amplify the actuation induced by the rotation of the rack screw 38. In various examples, the concavity provided in the central roller 18 can aid in positioning and lateral retention of the carriage assembly 14 relative to the rack screw 38. In some examples, the central roller 18 and/or the drive wheel 158 may extend or protrude below the carriage assembly 14 to interact with the rack screw 38. The extent to which the central roller 18 and/or the drive wheel 158 extends or protrudes below the carriage assembly 14 may be less than about 8 mm, less than about 7 mm, less than about 6 mm, less than about 5 mm, less than about 4 mm, less than about 3 mm, greater than about 2 mm, and/or combinations or ranges thereof, including intermediate values. A computer control module (CCM) may be provided in the components that engage with the carriage assembly 14 (e.g., the seating assemblies 102). The computer control module can manage instructional information that may be picked up from the data transmitters 126 by the data connectors 118 and/or positional data acquired from a transducer rail 162 positioned in the track assembly 34 and/or a transducer pick-up 166 positioned in the coupling portion 110 or the carriage assembly 14 such that actuation commands may be issued to the drive assembly 130. Each of the carriage assemblies 14 may be provided with a processor that is configured to interpret instructions from the data transmitters 126 and/or the positional data from the transducer rail 162 to actuate the lock assembly 94 or other components to engage with the rack screw 38 and position the carriage assembly 14 as instructed. In various examples, the track assembly 34 may include a grounding rail 170 and the coupling portion 110 and/or the carriage assembly 14 may include a grounding connector 174 that interacts with the grounding rail 170 to provide a ground or earth reference for electrical components.

Referring still further to FIGS. 4-7, the carriage rail 30 may have a generally sinusoidal shape that provides a plurality of slots that are defined by the apex and trough sections of the sinusoidal wave shape. Each of the slots may receive one of the central roller 18 and the side rollers 22. Lateral ends 178 of the carriage rail 30 may be generally arcuate or squared-off. The lateral ends 178, in some examples, may provide some degree of retention of the axle 26 to the carriage assembly 14 and/or may aid in vertical and/or horizontal positioning of the carriage assembly 14 within the track assembly 34. Additionally or alternatively, with regard to the retention of the axles 26 to the carriage assembly 14, the axles 26 may include retainer clips 182 at ends of the axle 26 such that the axle 26 is prevented from horizontal rattling, jostling, misplacement, and/or misalignment relative to the carriage rail 30. In various examples, the track assemblies 34 may be mounted to a floor 186 of the vehicle 10. Accordingly, a difference in height may exist on the floor 186 of the vehicle 10 due to the track assemblies 34 being positioned at some locations within the cabin of the vehicle 10 but not at other locations within the cabin of the vehicle 10. Therefore, a support material 190 or fill material may be provided at locations where the track assemblies 34 are not installed to provide a generally or substantially even surface for mounting a floor covering 194. The floor covering 194 may be provided with a bridge section 198 that covers the track assembly 34 at locations where a component is not coupled to the carriage assembly 14 such that the components of the carriage assembly 14 and the track assembly 34 may be protected from the ingress of debris while also protecting occupants and cargo of the vehicle 10 from entering the track assembly 34 inadvertently and leading to injury or damage. The bridge section 198 may be automatically actuated by the coupling portions 110 of the carriage assembly 14 once the component has been coupled to the carriage assembly 14. The coupling portions 110 may lift, otherwise push, or move the bridge section 198 out of the way as the carriage assembly 14 traverses the track assembly 34. In some examples, the coupling portions 110 or the components (e.g., the seating assembly 102) may be provided with a portion that replaces or otherwise pushes the bridge section 198 back into position once the coupling portions 110 have passed a region of the track assembly 34. In various examples, the support material 190 may define a tunnel 202 between adjacent track assemblies 34 and the floor 186. The tunnel 202 may be utilized for laying electrical wires or other vehicle components or vehicle connectivity solutions while maintaining a tidy overall appearance of the cabin of the vehicle 10.

Figure 6:
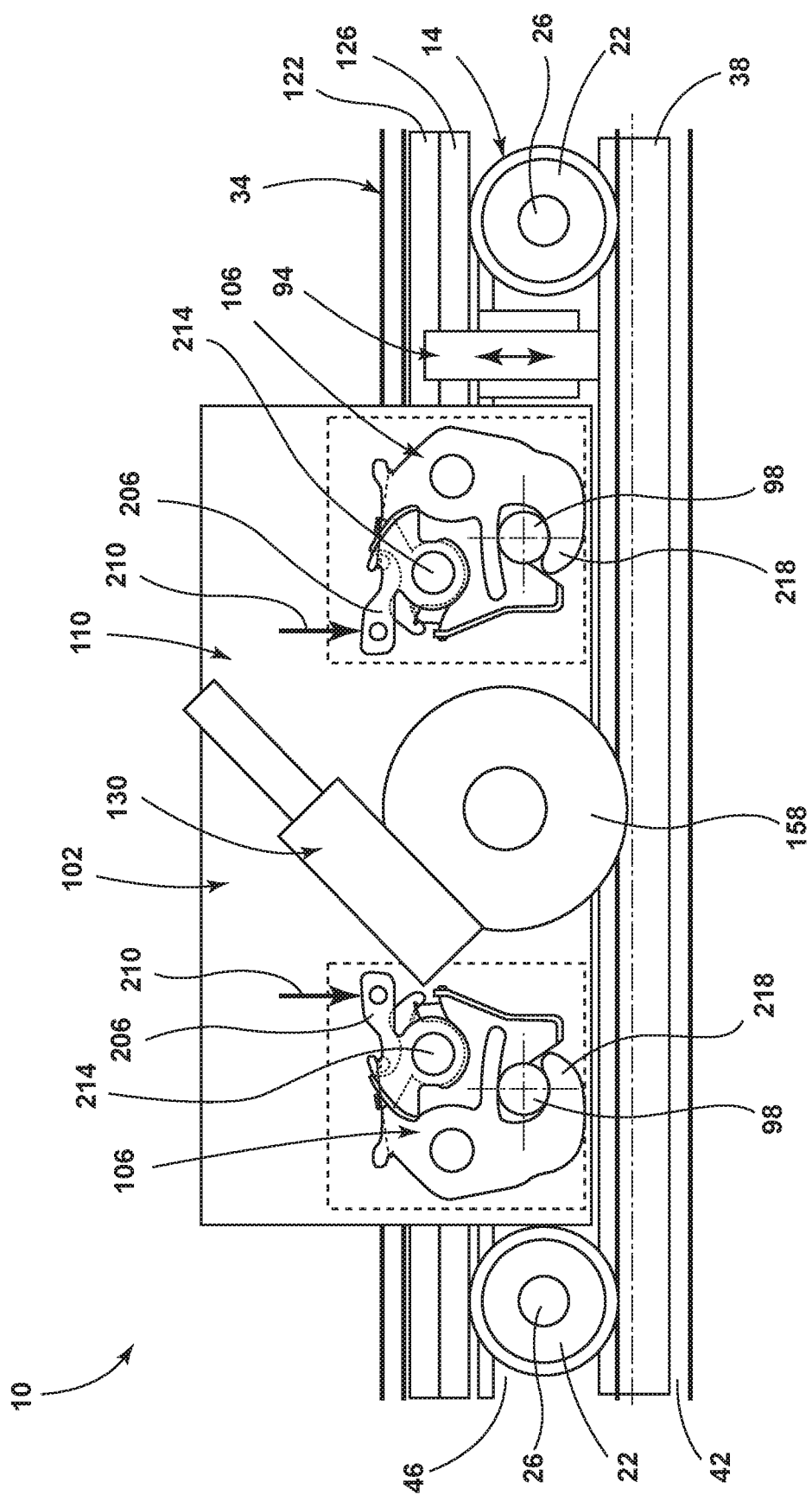
FIG. 6 is a side view of the track assembly and the carriage assembly, according to various examples, illustrating latches that engage with cross members of the carriage assembly.
Figure 7:
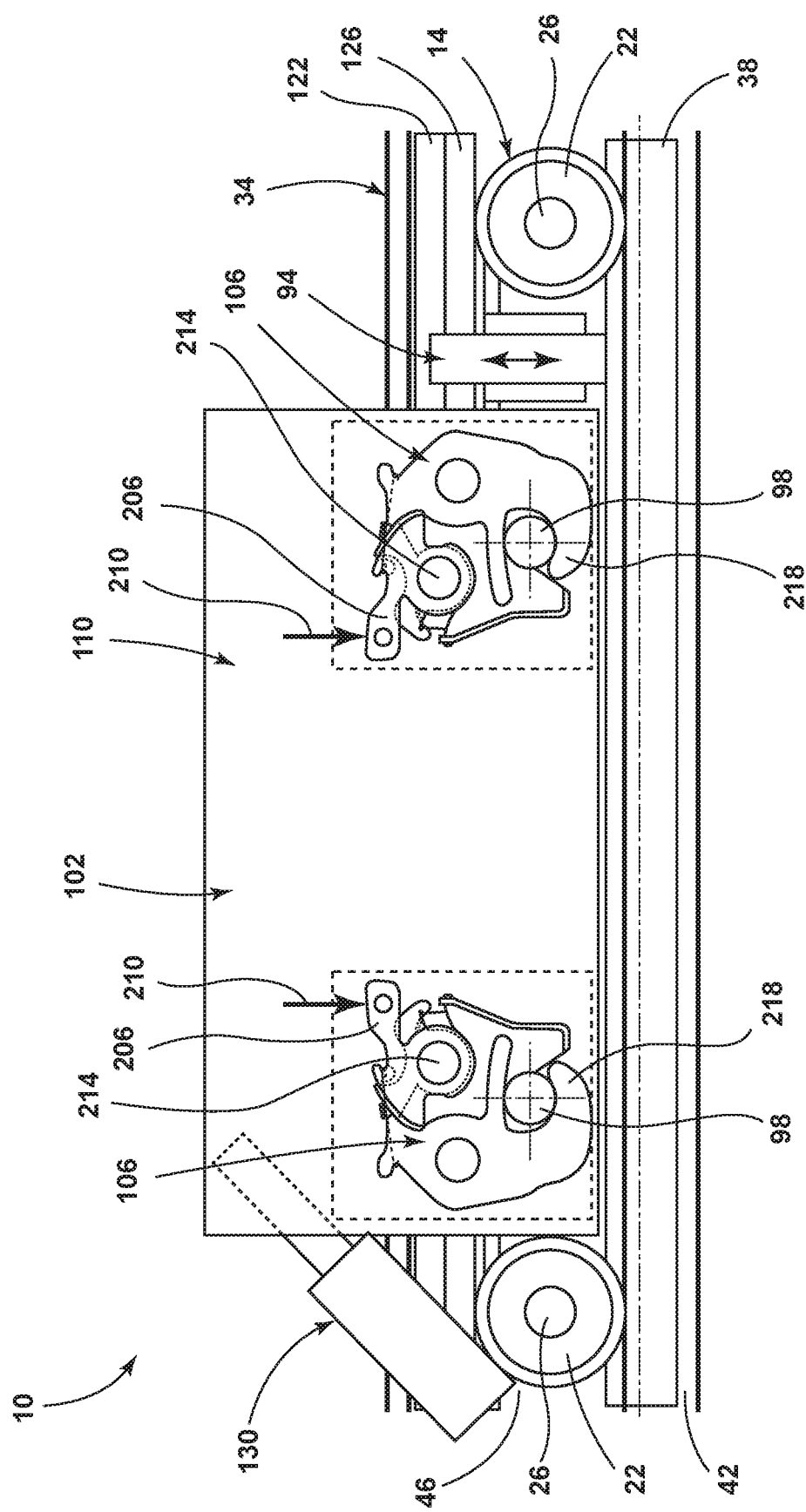
FIG. 7 is a side view of the track assembly and the carriage assembly, according to some example, illustrating the latches engaged with the cross members of the carriage assembly and a drive assembly engaged with the carriage assembly.

Referring now to FIGS. 6 and 7, the latches 106 may be provided with actuation arms 206 that are utilized to actuate the latches 106 between engaged and disengaged positions with the cross members 98. Application of a force 210 in a downward direction on the actuation arms 206 can induce rotation of the latch 106 about a pivot pin 214 such that a retention portion 218 is disengaged from the cross member 98. In various examples, coupling the component, such as the seating assembly 102, to the carriage assembly 14 may be accomplished in a drop-in fashion. In such examples, the latches 106 may be biased toward the disengaged position and as the retention portion 218 interacts with the cross member 98, then the latch 106 is induced to rotate about the pivot pin 214 toward the engaged position, which is depicted in FIG. 6. Alternatively, the latch 106 may be actuated to the engaged position by application of a vertically upward force to the actuation arm 206 that is opposite the force 210 to induce rotation of the latch about the pivot pin 214 such that the retention portion 218 engages with the cross member 98 in an active manner.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:
1. A vehicle, comprising:
    a carriage assembly having a central roller flanked by side rollers on an axle, a carriage rail supporting the axle; and a track assembly having a lead screw positioned in a lower portion of a channel, the channel receiving the carriage assembly such that a drive wheel engages with the lead screw.

2. The vehicle of claim 1, further comprising:
a lock assembly positioned on the carriage assembly, the lock assembly being operable between an engaged position and a disengaged position with the lead screw.

3. The vehicle of claim 2, wherein the disengaged position of the lock assembly relative to the lead screw allows the carriage assembly to remain stationary as the lead screw rotates.

4. The vehicle of claim 1, wherein the drive wheel engages with threads on the lead screw such that the drive wheel can traverse a length of the lead screw while the lead screw is stationary.

5. The vehicle of claim 1, wherein the lead screw is rotatable and comprises threads that engage with the drive wheel such that rotation of the lead screw results in horizontal actuation of the carriage assembly.

6. The vehicle of claim 1, wherein the carriage assembly comprises a cross member that is engaged by a latch of a seating assembly when the seating assembly is coupled to the carriage assembly.

7. The vehicle of claim 6, wherein the cross member is oriented generally perpendicular to a travel direction of the carriage assembly.

8. The vehicle of claim 1, wherein the carriage assembly comprises a worm drive that drives the drive wheel.

9. The vehicle of claim 1, wherein the central roller is provided with a concave shape that the lead screw is received within.

10. The vehicle of claim 1, further comprising:
a drive module positioned proximate an end of the track assembly, the drive module comprising a motor that drives the lead screw in at least one of a clockwise and a counter-clockwise direction.

11. The vehicle of claim 10, wherein the drive module further comprises a transfer gear that is positioned between a drive shaft and the lead screw, the transfer gear being driven by the drive shaft to induce rotational motion of the lead screw.

12. A vehicle, comprising:
a carriage assembly having a central roller flanked by side rollers on an axle, a carriage rail supporting the axle and having a generally sinusoidal shape; and
a track assembly having a lead screw positioned in a lower portion of a channel, the channel receiving the carriage assembly such that a drive wheel is permitted to engage with the lead screw.

13. The vehicle of claim 12, further comprising:
a lock assembly positioned on the carriage assembly, the lock assembly being operable between an engaged position and a disengaged position with the lead screw, wherein the disengaged position of the lock assembly relative to the lead screw allows the carriage assembly to remain stationary as the lead screw rotates.

14. The vehicle of claim 12, wherein the drive wheel engages with threads on the lead screw such that the drive wheel can traverse a length of the lead screw while the lead screw is stationary.

15. The vehicle of claim 12, wherein the lead screw is rotatable and comprises threads that engage with the drive wheel such that rotation of the lead screw results in horizontal actuation of the carriage assembly.

16. The vehicle of claim 12, wherein the carriage assembly comprises a cross member that is engaged by a latch of a seating assembly when the seating assembly is coupled to the carriage assembly, wherein the cross member is oriented generally perpendicular to a travel direction of the carriage assembly.

17. The vehicle of claim 12, further comprising:
a drive module positioned proximate an end of the track assembly, the drive module comprising a motor that drives the lead screw in at least one of a clockwise and a counter-clockwise direction, the drive module further comprising a transfer gear that is positioned between a drive shaft and the lead screw, the transfer gear being driven by the drive shaft to induce rotational motion of the lead screw.

18. A vehicle, comprising:
a carriage assembly having a central roller flanked by side rollers on an axle, a carriage rail supporting the axle and having a generally sinusoidal shape, the carriage rail positioned such that the central roller and the side rollers are separated from one another by the carriage rail; and
a track assembly having a lead screw positioned in a lower portion of a channel, the channel receiving the carriage assembly such that a drive wheel engages with the lead screw.

19. The vehicle of claim 18, wherein the lead screw is rotatable and comprises threads that engage with the drive wheel such that rotation of the lead screw results in horizontal actuation of the carriage assembly, wherein the drive wheel engages with the threads on the lead screw such that the drive wheel can traverse a length of the lead screw while the lead screw is stationary.

20. The vehicle of claim 18, further comprising:
a drive module positioned proximate an end of the track assembly, the drive module comprising a motor that drives the lead screw in at least one of a clockwise and a counter-clockwise direction, the drive module further comprising a transfer gear that is positioned between a drive shaft and the lead screw, the transfer gear being driven by the drive shaft to induce rotational motion of the lead screw.

* * * * *